(12) United States Patent
Smith et al.

(10) Patent No.: US 12,743,693 B2
(45) Date of Patent: Sep. 22, 2026

(54) COMPUTER SYSTEMS AND METHODS FOR GENERATION OF CHECK PROCESSING TEST DATA

(71) Applicant: Capital One Financial Corporation, McLean, VA (US)

(72) Inventors: Keith Smith, Raleigh, NC (US); Bryce Curtis, Apex, NC (US)

(73) Assignee: Capital One Financial Corporation, McLean, VA (US)

( * ) Notice: Subject to any disclaimer, the term of this patent is extended or adjusted under 35 U.S.C. 154(b) by 118 days.

(21) Appl. No.: 18/357,643

(22) Filed: Jul. 24, 2023

(65) Prior Publication Data

US 2025/0037122 A1 Jan. 30, 2025

(51) Int. Cl.
*G06Q 20/38* (2012.01)
*G06Q 20/04* (2012.01)

(52) U.S. Cl.
CPC ....... *G06Q 20/383* (2013.01); *G06Q 20/0425* (2013.01); *G06Q 2220/00* (2013.01)

(58) Field of Classification Search
None
See application file for complete search history.

(56) References Cited

U.S. PATENT DOCUMENTS 8,392,332 B1 3/2013 Oakes, III et al.
2008/0002911 A1* 1/2008 Eisen .................. H04N 1/4486 382/283
2011/0258601 A1* 10/2011 Ndem ................ G06F 11/3676 717/124
2015/0347278 A1* 12/2015 Sinha ................. G06F 11/3698 714/38.1
2019/0073643 A1 3/2019 Kligman
2019/0079759 A1* 3/2019 Kadam .................. G06F 8/443
(Continued)

FOREIGN PATENT DOCUMENTS

CN 115543786 A 12/2022
CN 116069669 A 5/2023
EP 1001392 A2 5/2000

OTHER PUBLICATIONS

Path Testing, Apr. 12, 2020 (Year: 2020).*
(Continued)

*Primary Examiner* — Patrick Mcatee
*Assistant Examiner* — Timothy Paul Sax
(74) *Attorney, Agent, or Firm* — Lee Sullivan Shea & Smith LLP

(57) ABSTRACT

A computing platform may be installed with software technology for generating anonymized test check data that configures the computing platform to: (i) determine a set of possible code paths encoded within a software application associated with check processing; (ii) based on the determined set of possible code paths and a set of electronic check records for individual checks, determine a subset of electronic check records from the set of electronic check records to be used for testing the software application; and (iii) anonymize the subset of electronic check records to be used for testing the software application by, for each respective electronic check record in the subset of electronic check records, modifying the respective electronic check record and thereby producing a respective anonymized check record for the respective electronic check record.

18 Claims, 7 Drawing Sheets

(56) References Cited

U.S. PATENT DOCUMENTS

| | | | | |
|---|---|---|---|---|
| 2020/0111063 | A1* | 4/2020 | Clausen | G06Q 20/4016 |
| 2021/0004314 | A1* | 1/2021 | Emek | G06F 11/3616 |
| 2022/0188219 | A1* | 6/2022 | Hicks | G06F 11/3692 |
| 2022/0283930 | A1* | 9/2022 | Figueredo De Santana | G06F 11/3688 |

OTHER PUBLICATIONS

Wikipedia, "Cheque Clearing", Retrieved from "https://en.wikipedia.org/w/index.php?title=Cheque_clearing&oldid=1141399459", retrieved on Aug. 23, 2023, 5 pages.
"How Does the Check Clearing Process Work?", https://gocardless.com/en-us/guides/posts/how-does-the-check-clearing-process-work/#:~:text=The check will move from,funds from the drawing bank, retrieved on Aug. 23, 2023, 12 pages.
"How the Federal Reserve Check Clearinghouse Operates", https://www.techchecks.net/resources/how-the-federal- reserve-check-clearinghouse-operates, retrieved on Apr. 4, 2023, 2 pages.
"Image Cash Letter Definition", https://www.lawinsider.com/dictionary/image-cash-letter, retrieved on Apr. 4, 2023, 4 pages.
"Regulation CC (Availability of Funds and Collection of Checks)", Federal Reserve Board—Frequently Asked Questions about Check 21, https://www.federalreserve.gov/paymentsystems/regco-faqcheck21.htm, retrieved on Apr. 4, 2023, 9 pages.
ANSI, "TIFF Image Format for Image Exchange", American National Standard for Financial Services, ANSI X9.100-181-2014 (R2021), 2014, 19 pages.
Bernardo, Richie, "Check Processing: What Happens When You Write A Check?", https://wallethub.com/edu/check-processing/14282, Jul. 22, 2015, 9 pages.
Blob, "How to Read/parse an X9.37 File via Apex?", Salesforce Stack Exchange, https://salesforce.stackexchange.com/questions/299206/how-to-read-parse-an-x9-37-file-via-apex, retrieved on Apr. 3, 2023, 5 pages.
DigerTech, "DigerTech—X9.37, X9.100-180 and UCD Resources", retrieved on Apr. 4, 2023, 4 pages.
Federal Financial Institution, "Consumer Compliance FAQ for Check Clearing for the 21st Century Act (Check 21) and the Implementing Regulation (12 CFR 229)", Check Clearing for the 21st Century Act Compliance Information for Examiners and Industry, retrieved on Apr. 4, 2023, 5 pages.
Financial Services, Federal Reserve, "Image Cash Letter Customer Documentation", Federal Reserve Adoption of DSTU X9.37-2003, Version 1.9, Apr. 26, 2019, 48 pages.
MAGNIFAI, "A Machine Learning Approach for Optimizing Testing Coverage", https://www.linkedin.com/pulse/machine-learning-approach-optimizing-testing-coverage-magnifai/, Mar. 29, 2023, 11 pages.
The Federal Reserve frbservices.org, "Check 21-Enabled Products Technical Information", https://www.frbservices.org/, retrieved on Apr. 4, 2023, 2 pages.
Wikipedia, "Check 21 Act", https://en.wikipedia.org/wiki/Check_21_Act, retrieved on Apr. 4, 2023, 3 pages.
International Bureau, International Search Report and Written Opinion mailed on Nov. 6, 2024, issued in connection with International Application No. PCT/US2024/039189, filed on Jul. 23, 2024, 6 pages.

* cited by examiner

| Check # | Payee Name | Payor Name | Account # | Amount |
| --- | --- | --- | --- | --- |
| 1 | Name 1 | Name 7 | 111115 | 100 |
| 2 | Name 2 | Name 8 | 222225 | 100 |
| 3 | Name 3 | Name 9 | 333335 | 200 |
| 1500 | Name 4 | Name 10 | 44444 | 500 |
| 3450 | Name 5 | Name 11 | 55555 | 300 |
| 5000 | Name 6 | Name 12 | 44444 | 500 |

| Check # | Original Check # | Payee Name | Payor Name | Account # | Amount |
| --- | --- | --- | --- | --- | --- |
| 1 | 1 | John | John | 111005 | 100 |
| 2 | 2 | John | John | 222000 | 100 |
| 3 | 3 | John | John | 333000 | 200 |
| 4 | 1500 | John | John | 00000 | 500 |
| 5 | 3450 | John | John | 00000 | 300 |

COMPUTER SYSTEMS AND METHODS FOR GENERATION OF CHECK PROCESSING TEST DATA

BACKGROUND

Various financial institutions play a role in processing checks, including the banks of the payor (e.g., the individual or organization that issued the check) and the payee (e.g., the individual or organization that received the check).

In the past, the task of processing a check typically involved the payee's bank mailing a paper check to a clearing unit, which then forwarded the check to the payor's bank. However, as technology has evolved, the task of processing a check is now typically carried out electronically via computing systems operated by the financial institutions involved in the check processing process.

Overview

Disclosed herein is new software technology for generating anonymized check data that can be used for purposes of testing a software application that processes electronic representations of checks.

In one aspect, the disclosed technology may take the form of a method to be carried out by a computing platform that involves: (i) determining a set of possible code paths encoded within a software application associated with check processing; (ii) based on the determined set of possible code paths and a set of electronic check records for individual checks, determining a subset of electronic check records from the set of electronic check records to be used for testing the software application, wherein each of the electronic check records in the subset corresponds to a respective one of the possible code paths; and (iii) anonymizing the subset of electronic check records to be used for testing the software application by, for each respective electronic check record in the subset of electronic check records, modifying the respective electronic check record and thereby producing a respective anonymized check record for the respective electronic check record.

In an example, the method further involves storing the anonymized subset of check records in source control system, such that the anonymized subset of check records is accessible for testing the software application.

In an example, the method further involves storing the anonymized subset of check records in a data file that is formatted in a check-processing format utilized by the software application.

In an example, based on the determined set of possible code paths and a set of electronic check records for individual checks, determining a subset of electronic check records from the set of electronic check records to be used for testing the software application involves minimizing a number of electronic check records included in the subset such that the subset of electronic check records comprises a single electronic check record for each possible code path in the set of possible code paths.

In an example, based on the determined set of possible code paths and a set of electronic check records for individual checks, determining a subset of electronic check records from the set of electronic check records to be used for testing the software application involves determining the subset based on the possible code paths and values that are derived from the check records for a predefined set of variables that impact code paths to be utilized during processing of checks using the software application.

In an example, based on the determined set of possible code paths and a set of electronic check records for individual checks, determining a subset of electronic check records from the set of electronic check records to be used for testing the software application involves iterating through the electronic check records in the set of electronic check records for individual checks, wherein said iterating involves, for each respective electronic check record in the set of electronic check records for individual checks: (i) based on the respective electronic check record, determining values for the predefined set of variables that are associated with the respective electronic check record; (ii) based on the determined values for the predefined set of variables, (a) determining a given possible code path that will be utilized during processing of the respective electronic check record and (b) generating an identifier for the respective electronic check record that corresponds to the given possible code path; (iii) determining whether an electronic check record for any other check having the generated identifier has been added to the subset of electronic check records; and (iv) based on the determining, either (a) adding the respective electronic check record to the subset of electronic check records if an electronic check record for a check having the generated identifier has not been previously added to the subset of electronic check records, or (b) forgoing adding the respective electronic check record to the subset of electronic check records if an electronic check record for a check having the generated identifier has already been previously added to the subset of electronic check records.

In an example, anonymizing the subset of electronic check records to be used for testing the software application by, for each respective electronic check record in the subset of electronic check records, modifying the respective electronic check record and thereby producing a respective anonymized check record for the respective electronic check record involves, for each respective electronic check record in the subset of electronic check records performing one or more of the following: (i) anonymizing image data of the respective electronic check record; (ii) anonymizing a name associated with a name data field of the respective electronic check record; and (iii) anonymizing an account number associated with an account number data field of the respective electronic check record.

In an example, determining the set of possible code paths encoded within the software application associated with check processing involves using a code coverage analytic tool to identify the set of possible code paths.

In an example, determining the set of possible code paths encoded within the software application associated with check processing involves: (i) using one or more machine learning models to output predicted possible code paths for the software application and (ii) based on the predicted possible code paths for the software application, identifying the set of possible code paths.

In an example, the method further involves testing the software application using the anonymized subset of electronic check records.

In yet another aspect, disclosed herein is a computing platform that includes a communication interface, at least one processor, at least one non-transitory computer-readable medium, and program instructions stored on the at least one non-transitory computer-readable medium that are executable by the at least one processor to cause the computing platform to carry out the functions disclosed herein, including but not limited to the functions of the foregoing method.

In still another aspect, disclosed herein is a non-transitory computer-readable medium provisioned with program instructions that, when executed by at least one processor, cause a computing platform to carry out the functions disclosed herein, including but not limited to the functions of the foregoing method.

One of ordinary skill in the art will appreciate these as well as numerous other aspects in reading the following disclosure.

Figure 1:
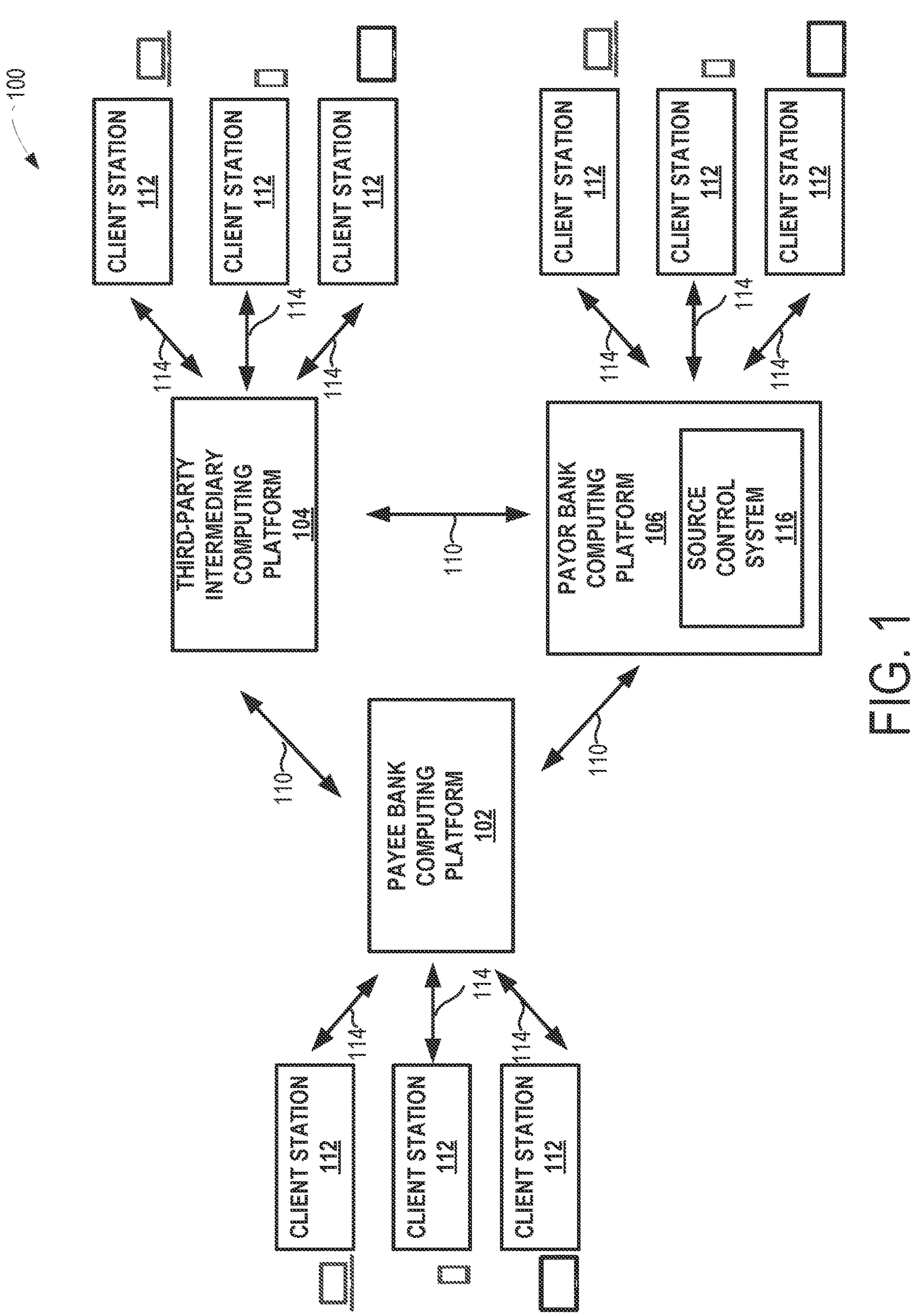
FIG. 1 depicts an example network configuration including example computing platforms operated by financial institutions, according to aspects of the disclosed technology.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

As noted above, various financial institutions play a role in processing checks, including the banks of the payor (e.g., the individual or organization that issued the check) and the payee (e.g., the individual or organization that received the check). In the past, the task of processing a check typically involved the payee's bank mailing a paper check to a clearing unit, which then forwarded the check to the payor's bank. However, as technology has evolved, the task of processing a check is now typically carried out electronically via computing systems operated by the financial institutions involved in the check processing process.

According to one typical workflow for electronic processing of a check that exists today, a payee's bank operates a computing platform that functions to transmit an electronic representation of a deposited check over a data network to a computing platform operated by a third-party intermediary that is involved in clearing checks, such as a local clearinghouse exchange, the Federal Reserve Bank, a credit union, or a correspondent bank, among other possibilities. In practice, the electronic representation of a deposited check could be generated in various ways, such as by a scanner operated by a bank employee, by software running on a client device of the payee (e.g., a mobile check deposit software), or by software running on a computing platform of the payee bank, among other possibilities. Further, in practice, the electronic representation of the deposited check may be sent to the computing platform operated by the third-party intermediary along with a collection of a plurality of electronic representations of other deposited checks (e.g., other checks deposited at the payee's bank that day).

The computing platform operated by the third-party intermediary then performs certain tasks for processing the deposited check and, in particular, for the purpose of clearing the check. In an example, the payor bank and the payee bank may each have an account with this third-party intermediary. Upon receiving the electronic representation of the deposited check, the computing platform operated by the third-party intermediary may identify the payor bank (i.e., the bank from which the check is drawn) using a nine-digit routing number located on the bottom left-hand corner of the check. A unique routing number is typically assigned to every financial institution in the United States. The third-party intermediary may then send the electronic representation of the deposited check to the payor's bank. For instance, in an example, after the third-party intermediary identifies the payor bank, the computing platform operated by the third-party intermediary forwards the electronic representation of the deposited check to a computing platform operated by the payor's bank.

After receiving the electronic representation of the deposited check, the computing platform of the payor's bank then performs tasks for processing the check, such as matching up the deposited check with the payor bank's customer account of the payor and debiting the customer account of the payor, so that the customer account is updated to reflect that the check was processed. In an example, if the processing conducted by the payor bank reveals that the customer account had insufficient funds for the deposited check, the payor bank may send a notification of insufficient funds to the third-party intermediary. Additional tasks performed by the payor bank for processing checks are possible as well. For instance, the tasks performed by the payor bank for processing checks may further include fraud detection, error checking, duplicate detection (e.g., if a check is over a certain amount), and/or notification tasks associated with given checks (e.g., large dollar notification (LDN) tasks associated with one or more checks over a threshold amount), among other possibilities. Further, in practice, the electronic representation of the deposited check may be sent to the computing platform operated by the payor's bank along with a collection of a plurality of other electronic representations of checks associated with the payor bank's customer accounts (e.g., other checks deposited at the payee's bank and/or other banks that day), and the computing platform of the payor's bank may perform these tasks for processing each check.

After the payor's bank performs tasks for processing the check, the payor's bank may send confirmation to the third-party intermediary that the payor bank will honor the check. In response to receiving the confirmation that the payor bank will honor the check, the third-party intermediary may then debit funds from the account associated with the payor bank and credit funds to the account associated with the payee bank.

Other tasks performed by the payee bank, the third-party intermediary, and/or the payor bank for the purpose of clearing the check are possible as well. Further, other example workflows for electronic processing of a check are possible as well.

In some cases, it is possible that the computing platform of the payee bank may transmit the electronic representation of the deposited check to the computing platform of the payor's bank rather than to a computing platform of a third-party intermediary. For example, for a given deposited check, the payor's bank may be a correspondent bank of the payee's bank (e.g., the payee bank and the payor bank may be engaged in a partnership with one another). Thus, for the given deposited check, the payee's bank may bypass the third-party intermediary (e.g., the regional branch of the Federal Reserve Bank) and clear the check directly with the payor's bank. In another example, the account of the payee and the account of the payor may both be held at the same bank, in which case the check may be cleared internally.

The electronic representation of the deposited check may take various forms and may include various information. In general, any information required for processing of the checks may be included in the electronic representation of a deposited check. For instance, the information included in the electronic representation of a deposited check may include, for instance, payee information, payor information, payor bank information, check information (e.g., check number, check amount, check image, check image data, etc.), and/or processing information, among other possibilities. In practice, the information included in the electronic representation of a deposited check that is transferred between the computing platforms of the payee's bank, the third-party intermediary, and/or the payor's bank is typically governed by industry standards. For example, the Federal Reserve Bank uses the Accredited Standards Committee X9's Specifications for Electronic Exchange of Check and Image Data, known as the "DSTU X9.37-2003//X9.100-187-2013 standard" (which may hereinafter be referred to as the "X9.37 standard"). Thus, when an electronic representation of a check (e.g., an image cash letter (ICL) file formatted in accordance with the X9.37 standard) is either sent from a financial institution to the Federal Reserve Bank or sent from Federal Reserve Bank to a financial institution, the electronic representation of a check may comply with the X9.37 standard. Other industry standards are possible as well.

The electronic representation of the deposited check may include various fields and data associated with those various fields. For instance, in a scenario where the electronic check record complies with the X9.37 standard, the electronic check record includes data for the deposited check that is associated with various record types and/or fields. For instance, the X9.37 standard specifies a check detail record type that is associated with various fields such as an "Auxiliary On-Us" field, an "External Processing Code" field, a "Payor Bank Routing Number Check Digit" field, an "On-Us" field, an "ECE Institution Item Sequence Number" field, a "Documentation Type Indicator" field, an "Electronic Return Acceptance Indicator" field, an "MICR Valid Indicator" field, a "BOFD Indicator" field, a "Correction Indicator" field, and/or an "Archive Type Indicator" field, among other possibilities. Further, the X9.37 standard also specifies an image view data record type that is associated with various fields such as a "Security Originator Name" field, a "Security Authenticator" field, a "Security Key Name" field, a "Clipping Origin" field, a "Clipping Coordinate h1" field, a "Length of Image Reference Key" field, an "Image Reference Key" field, a "Length of Digital Signature" field, and/or a "Digital Signature" field, among other possibilities. The electronic check record may include data associated with other record types and/or fields as well.

Further, in accordance with the X9.37 standard, electronic representations of many different checks are typically packaged together into a single file that is sometimes referred to as an "X9.37 file" before being sent between computing platforms of financial institutions. In some examples, the number of checks in a single X9.37 file may be on the order of hundreds, thousands, or tens of thousands, among other possibilities.

Returning to the check-processing process for processing a deposited check, one example of a computing environment in which this check-processing process may be carried out is shown in FIG. 1. For instance, FIG. 1 depicts a network environment 100 that includes an example computing platform 102 operated by a payee's bank, an example computing platform 104 operated by a third-party intermediary, and an example computing platform 106 operated by a payor's bank. Computing platforms 102, 104, and 106 may communicate with each other via network-based communication paths 110. In this respect, each respective communication path 110 between one of computing platforms 102, 104, and 106 and another one of computing platforms 102, 104, and 106 may generally comprise one or more communication networks and/or communications links, which may take any of various forms. For instance, each respective communication path 110 may include any one or more of point-to-point links, Personal Area Networks (PANs), Local-Area Networks (LANs), Wide-Area Networks (WANs) such as the Internet or cellular networks, and/or cloud networks, among other possibilities. Further, the communication networks and/or links that make up each respective communication path 110 may be wireless, wired, or some combination thereof, and may carry data according to any of various different communication protocols. Although not shown, the respective communication paths 110 between one of computing platforms 102, 104, and 106 and another one of computing platforms 102, 104, and 106 may also include one or more intermediate systems. For example, it is possible that a computing platform may communicate with another computing platform via one or more intermediary systems, such as a host server (not shown). Many other configurations are also possible.

In the example of FIG. 1, computing platform 102 and computing platform 106 are shown as being configured to communicate with each other via a respective communication path 110. As mentioned above, in some examples, for the given deposited check, the payee's bank may bypass the third-party intermediary (e.g., the regional branch of the Federal Reserve Bank) and clear the check directly with the payor's bank. In such a scenario, computing platform 102 and computing platform 106 may, for example, communicate with each other via a communication path 110 to clear the check. However, in other scenarios, such as when a third-party intermediary is involved in the check-clearing process, computing platform 102 and 106 may each be configured to communicate with computing platform 104 but not with each other.

Further, in practice, each of computing platforms 102, 104, and 106 may generally comprise some set of physical computing resources (e.g., processors, data storage, etc.) that are configured to run the software subsystems discussed herein, among various other software subsystems that may be hosted and run by the computing platform. This set of physical computing resources take any of various forms. As one possibility, computing platforms 102, 104, and 106 may each comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, computing platforms 102, 104, and 106 may each comprise "on-premises" computing resources of the financial institution that operates the example computing platform (e.g., institution-owned servers). As yet another possibility, example computing platforms 102, 104, and 106 may each comprise a combination of cloud computing resources and on-premises computing resources. Other implementations of computing platforms 102, 104, and 106 are possible as well.

As further shown in FIG. 1, example network environment 100 may also include example client stations 112 that may be utilized by users associated with the financial institutions to access and interact with one or more of the computing platforms 102, 104, and 106. Each of computing platforms 102, 104, and 106 may be configured to interact with client stations 112 over respective network-based communication paths 114. In this respect, each respective communication path 114 between one of computing platforms 102, 104, and 106 and a client station 112 may generally comprise one or more communication networks and/or communications links, which may take any of various forms. For instance, each respective communication path 114 may include any one or more of point-to-point links, Personal Area Networks (PANs), Local-Area Networks (LANs), Wide-Area Networks (WANs) such as the Internet or cellular networks, and/or cloud networks, among other possibilities. Further, the communication networks and/or links that make up each respective communication path 114 may be wireless, wired, or some combination thereof, and may carry data according to any of various different communication protocols. Although not shown, the respective communication paths 114 between the client stations 112 and the computing platforms 102, 104, and 106 may also include one or more intermediate systems. For example, it is possible that a computing platform may communicate with a given client station 112 via one or more intermediary systems, such as a host server (not shown). Many other configurations are also possible.

As noted above, the example network environment 100 may also include client stations 112 that may be utilized by users associated with the financial institutions to access and interact with computing platforms 102, 104, and 106. In this respect, each client station 112 may include hardware components such as a processor, data storage, a communication interface, and user-interface components (or interfaces for connecting thereto), among other possible hardware components, as well as software that facilitates the client station's ability to interact with one or more of computing platform 102, 104, and 106 in order to access the services hosted by the computing platform(s) (e.g., operating system software, web browser software, a mobile application, etc.). As representative examples, each client station 112 may take the form of a computing device such as a desktop computer, a laptop, a netbook, a tablet, a smartphone, or a personal digital assistant (PDA), among other possibilities. In FIG. 1, example network environment 100 includes three example client stations 112 that may be utilized by users associated with the payee bank to access and interact with the computing platform 102, three example client stations 112 that may be utilized by users associated with the third-party intermediary to access and interact with the computing platform 104, and three example client stations 112 that may be utilized by users associated with the payor bank to access and interact with the computing platform 106. While FIG. 1 shows an arrangement in which three client stations are communicatively coupled to each computing platform, it should be understood that this is merely for purposes of illustration and that any number of client stations may communicate with each computing platform.

It should be understood that network environment 100 is one example of a network configuration in which embodiments described herein may be implemented. Numerous other arrangements are possible and contemplated herein. For instance, other network configurations may include additional components not pictured and/or more or less of the pictured components.

Each of computing platforms 102, 104, and 106 may be installed with one or more software applications that each play some role in the electronic check processing flow. At a high level, in operation, such a software application may receive an electronic representation of a check and then perform some task(s) with respect to the electronic representation of a check. Any suitable software applications for processing checks are possible. The payee bank, third party-intermediary, and payor back of FIG. 1 may each have different software for processing checks. For instance, computing platform 102 may have processing software to process electronic representations of checks deposited at the payee bank, which may involve sending electronic representations of checks deposited at the payee bank to an entity for clearing of the deposited checks (e.g., a third-party intermediary) and crediting accounts of users that deposited the checks. Such crediting accounts of users that deposited the checks may, for example, occur after the third-party intermediary and payor bank have performed their tasks for processing the checks. Further, computing platform 104 may have processing software to process electronic representations of checks received from a plurality of banks (including the payee bank), which may involve tasks for clearing the electronic representations of checks received from the plurality of banks. Still further, computing platform 106 may have processing software to process electronic representations of checks received from the third-party intermediary, which may involve tasks such as matching the deposited check to a customer account, validation of sufficient funds for the customer account, debiting the customer bank accounts, error checking, fraud detection, notification tasks, and/or duplicate detection, among other possibilities.

In addition to different financial institutions having different software applications to process checks, each financial institution may have a plurality of different software applications for processing checks. For instance, a financial institution may have different sets of customers (e.g., business customers v. individual customers), and in turn the financial institution may have different software applications for processing checks for the different sets of customers. Other example software applications for processing checks are possible as well.

It is very important that these software applications involved in the check processing flow function as intended, because otherwise, various issues could arise during check processing. For example, software issues could lead to failures in the check processing flow that erroneously prevent checks from being cleared even though sufficient funds were available and all the other conditions for clearing were met. As another example, software issues could erroneously allow checks to be cleared that should not have been cleared. As yet another example, software issues could erroneously allow a duplicate check to be cashed (i.e., a check that is a duplicate copy of a previously cashed check). As still yet another example, software issues could lead to failure to detect check fraud or to erroneously make a determination of check fraud. As still yet another example, software issues could lead to failures to perform one or more notification tasks, such as LDN tasks or other notification tasks to be performed by a bank. Other example issues that could arise during check processing are possible as well.

To ensure that these software applications involved in the check processing flow will function as intended, such software applications need to be tested before they are deployed and may also need to be periodically tested after they are deployed as well. However, performing reliable testing of software applications involved in the check processing flow can present technical challenges. One such technical challenge is that, in order to reliably assess whether a software application associated with check processing is going to function as intended, the software application associated with check processing generally needs to be tested with real-world check data (i.e., a collection of electronic check records) that covers all of the possible code paths encoded within the software application.

As an illustrative example of all of the possible code paths encoded within the software application, an example check processing software application may have three different available codes paths and the particular code path to be utilized for processing a check may depend upon two variables: (i) the number of digits in the checking account number and (ii) the amount of the check. In this illustrative example, the first available code path encoded within the software application may be that, if the number of digits in the checking account number is greater than 10 and if the check amount is greater than or equal to 100, perform a first action. Further, the second available code path encoded within the software application may be that, if the number of digits in the checking account number is greater than 10 and if the check amount is less than 100, perform a second action. Still further, the third available code path encoded within the software application may be that, if the number of digits in the checking account number is less than or equal to 10, perform a third action. This illustrative example is intended as a simplistic example only, and in practice, other example software applications for processing a check may not only have more available code paths (e.g., a number of available code paths on the order of tens, hundreds, thousands, etc.) but the available code paths may also be dependent on a larger number of variable (e.g., a number of variables on the order of tens, hundreds, etc.).

To fulfill this need of testing the check-processing software application with real-world check data that covers all of the possible code paths encoded within the software application, a software developer may try to select and use a random sampling of historical real-world check data (i.e., check data that has previously been processed) in order to test a software application. However, this random-sampling approach is flawed for at least the reasons that (i) using a random sampling of historical real-world check data does not guarantee that all of the possible code paths will be tested, (ii) this approach requires the storage and processing of a large volume of real-world check data, which in turn consumes a larger extent of computing resources, and (iii) real-world check data cannot be stored as part of a source control system because it contains sensitive information. Other example reasons this approach of a random sampling of historical real-world check data is flawed are possible as well.

In another example, a software developer may try to review and curate a set of historical real-world check data to use for testing a given check-processing software application. However, while in theory an individual could try to review and curate a set of historical real-world check data to use for testing a given check-processing software application, check-processing software applications often have hundreds or even thousands of different code paths, which makes it practically impossible for a human to curate a set of historical real-world check data that will cover all possible code paths.

To address these and other problems, disclosed herein is new software technology for generating anonymized check data that can be used for purposes of testing a software application that processes electronic representations of checks. In this way, the disclosed technology enables financial institutions with an improved way to test software applications for processing electronic representations of checks prior to deploying the software application and/or after deploying the software application. In practice, the software technology disclosed herein may be implemented as a new software subsystem that is hosted by a computing platform operated by a financial institution. At a high-level, the computing platform is configured to reduce and anonymize real-world check data to form anonymized check test data. In an example, the computing platform is configured to: (i) determine a set of possible code paths encoded within a software application associated with check processing; (ii) based on the determined set of possible code paths and a set of electronic check records for individual checks, determine a subset of electronic check records from the set of electronic check records to be used for testing the software application, wherein each of the electronic check records in the subset corresponds to a respective one of the possible code paths; and (iii) anonymize the subset of electronic check records to be used for testing the software application by, for each respective electronic check record in the subset of electronic check records, modifying the respective electronic check record and thereby producing a respective anonymized check record for the respective electronic check record. As will be described in further detail below, in an example primary implementation, the software technology disclosed herein may be implemented as a new software subsystem that is hosted by a computing platform operated by a payor bank, such as the computing platform 106 of FIG. 1. However, while in a primary implementation, the new software subsystem is hosted by a payor's bank, in other examples the new software subsystem is hosted by other financial institutions, such as a payee bank or a third-party intermediary, among other possibilities.

Figure 2:
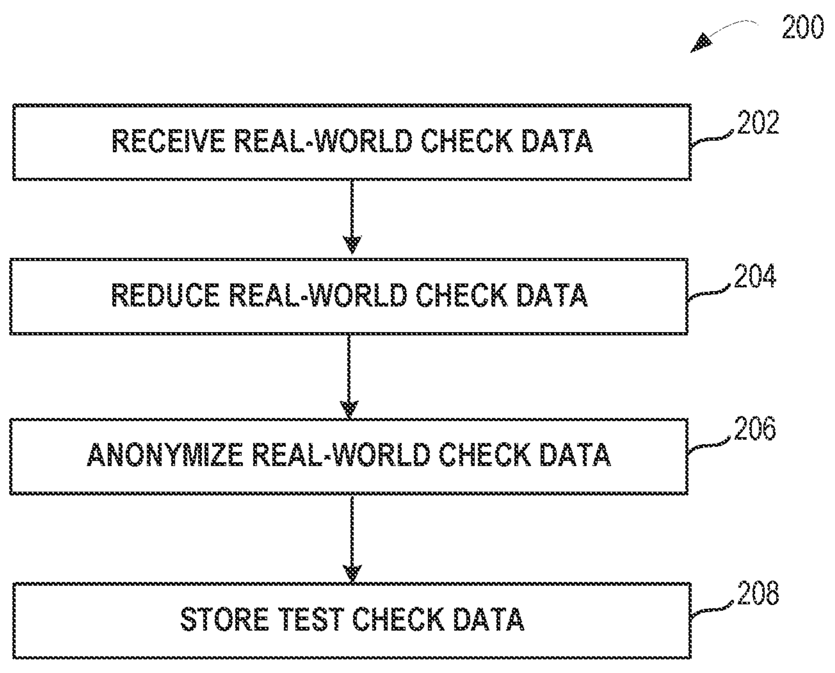
FIG. 2 depicts a flow diagram of an example process for generating anonymized check data that can be used for purposes of testing a software application that processes electronic representations of checks according to aspects of the disclosed technology.

FIG. 2 depicts one example of a process 200 that may be carried out in accordance with the disclosed technology for generating anonymized check data that can be used for purposes of testing a software application that processes electronic representations of checks. For purposes of illustration only, example process 200 is described as being carried out by computing platform 106 of FIG. 1, but it should be understood that example process 200 may be carried out by computing platforms that take other forms as well. Further, it should be understood that, in practice, the functions described with reference to FIG. 2 may be encoded in the form of program instructions that are executable by one or more processors of computing platform 106. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 2, the example process 200 may begin at block 202 with computing platform 106 receiving real-world check data. In general, the received real-world check data may be any suitable real-world check data and may comprise a set of electronic check records for individual real-world checks. In this regard, the real-world check data may take various forms. As one possibility, the real-world check data may take the form of one or more data files, where each data file includes a collection of a plurality of individual check records. In an example, the one or more data files are formatted according to a format associated with check processing. Various formats associated with check processing are possible, including, for instance, a format according to the X9.37 standard, among other possibilities. As another possibility, the real-world check data may take the form of a plurality of data files, where each data file is a data file for a single individual check record. Other forms of real-world check data are possible as well.

Further, in general, the source of origin of the real-world check data may be any suitable source. As one possibility, the real-world check data may be received from one or more financial institutions, such as a third party-intermediary and/or a payor bank(s). As another possibility, the real-world check data may be received from one or more bank customers. Other example sources of real-world check data are possible as well.

At block 204 of FIG. 2, computing platform 106 reduces the real-world check data so as to obtain reduced check data for test check data. At a high level, reducing the real-world check data involves computing platform 106 reducing the set of electronic check records, so as to obtain a subset of check records (which may also be referred to herein as a "reduced set of electronic check records") that includes a reduced number of electronic check records without losing test coverage for the software application to be tested. Further, in an example, reducing the set of electronic check records may involve obtaining a minimized subset of check records (which may also be referred to herein as a "minimized set of electronic check records"), without losing test coverage for the software application to be tested. In general, the set of electronic check records may be reduced or minimized in a way that takes a particular software application's possible paths for processing checks into account. For instance, the obtained subset of check records may include check records from the set of check records that are sufficient to test all possible paths of the particular software application's possible paths for processing checks, so as to ensure complete test coverage for testing the software application.

At block 206 of FIG. 2, computing platform 106 anonymizes the real-world check data so as to obtain anonymized check data for the test check data. At a high level, anonymizing the real-check data involves removing sensitive data from the real-world check data. The sensitive data to be removed may take various forms. For instance, the sensitive data may include check image data, payee-name data, payor-name data, and/or account-number data, among other possibilities. Other sensitive data to be removed is possible as well. Further, sensitive data may be removed in various ways including, for instance, deleting one or more portions of the real-world check data and/or altering one or more portions of the real-world check data such that the test check data does not include the sensitive data that was included in the real-world check data.

The reduced and anonymized check data may serve as test check data for testing the software application for processing checks. Further, at block 208, computing platform 106 may store the test check data, and this stored test check data may be used for testing the software application for processing checks.

In an example, computing platform 106 may carry our process 200 for a plurality of different software applications and may generate respective test check data for each software application.

In the example of FIG. 2, the reduction phase of block 204 is performed prior to anonymization phase of block 206. In this way, the computing platform may only perform anonymization of the subset of electronic check records, which may help reduce computing resources required to anonymize the real-world check data. However, in other examples, the step of anonymizing the real-world check data could take place prior to reducing the real-world check data. Other examples are possible as well.

The disclosed technology provides various advantages over existing methods for testing software applications for processing checks. For instance, the generated test data can be used to test all code paths of the software application. Thus, the generated test data may help to ensure that each possible code path is tested using real-world check data.

Further, the generated test data can beneficially be stored within a source control system. A source control system may be a system that allows developers to access software code and collaborate on software code. Financial institutions typically are unable to store real-world check data comprising sensitive information (e.g., user information) in a source control system. However, the generated test data can be stored within a source control system given that the generated test data is anonymized and thus does not include sensitive data that existed in the real-world check data.

Still further, the test check data may help to reduce computing resources required for testing software applications for processing checks. For instance, as an example, the test check data may help to reduce an amount of storage for storing the check data to be used to test the software application. In general, compared to the received real-world check data that is associated with a plurality of individual real-world checks, the test check data is associated with a reduced and/or minimized number of individual checks from the plurality of individual checks. By being associated with a reduced and/or minimized number of individual checks from the plurality of individual checks, an amount of data included in the test check data may be significantly reduced compared to an amount of data in the real-world check data. In practice, in a scenario where the real-world check data is stored in an X9.37 data file, the X9.37 data file may comprise individual check records on the order of thousands of checks (e.g., approximately 2,500 to 10,000 individual check records). The number of check records for the test check data may be significantly reduced (e.g., to on the order of tens or hundreds of checks, among other possibilities), and the reduced and/or minimized number of individual checks from the plurality of individual checks may substantially reduce a file size for the test check data (compared to the real-world check data). For instance, as an illustrative example, in a scenario where the real-world check data and the test check data are stored in X9.37 data files, an example X9.37 data file for the real-world check data may have a file size on the order of gigabytes (e.g., 5-10 gigabytes, among other possibilities), whereas an example X9.37 data file for the test check data may have a file size on the order of kilobytes (e.g., 10-100 kilobytes, among other possibilities). Other examples are possible as well.

As another example, the test check data may help to reduce computing resources utilized during testing of the software application. In addition to significantly reducing a file size, the reduced number reduced and/or minimized number of individual checks from the plurality of individual checks may beneficially reduce computing resources needed to test the software application, as the testing may involve testing based on a reduced number of electronic representations of checks. For instance, computing resources (e.g., processing power and/or processing time) required for processing test check data associated with a number of checks on the order of tens or hundreds of checks may be significantly less than computing resources required for processing check data associated with a number of checks on the order of thousands of check records.

Other example advantages over existing methods for testing software applications for processing checks are possible as well.

The function of reducing the real-world check data discussed with respect to block 204 and the function of anonymizing the real-world check data discussed with respect to block 206 will now be discussed in greater detail below with reference to FIGS. 3A-4B.

Figure 3A:
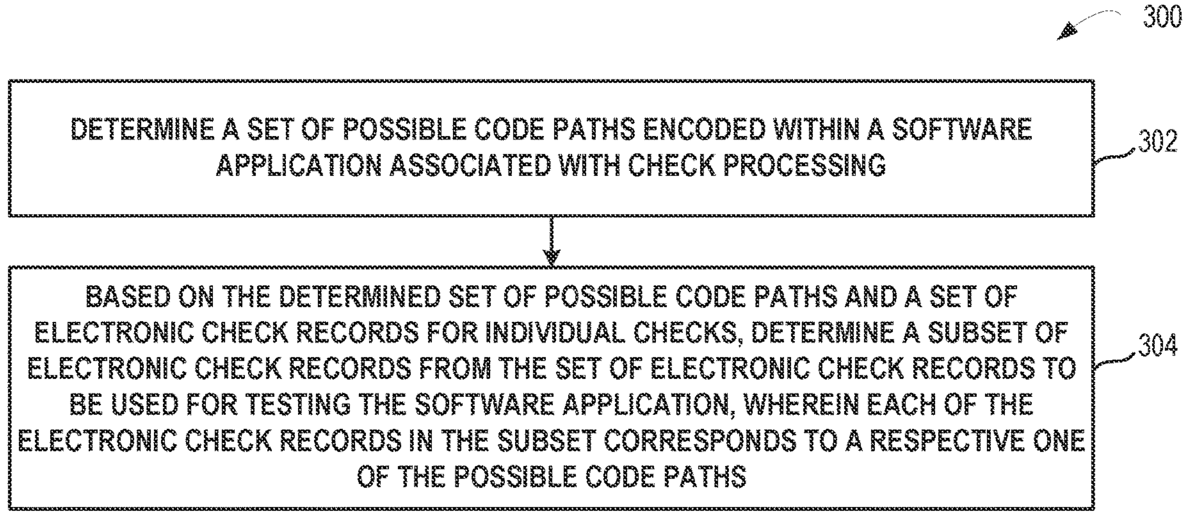
FIG. 3A depicts a flow diagram of an example process for reducing or minimizing real-world check data, according to aspects of the disclosed technology.

Turning to FIG. 3A, a flow diagram of an example process 300 that may be carried out by computing platform 106 in order to reduce or minimize real-world check data is depicted. For purposes of illustration only, example process 300 is described as being carried out by computing platform 106 of FIG. 1, but it should be understood that example process 300 may be carried out by computing platforms that take other forms as well. Further, it should be understood that, in practice, the functions described with reference to FIG. 3A may be encoded in the form of program instructions that are executable by one or more processors of computing platform 106. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 3A, the example process 300 may begin at block 302 with computing platform 106 determining a set of possible code paths encoded within a software application associated with check processing. Computing platform 106 may carry out the function of determining a set of possible code paths encoded within a software application associated with check processing in various ways, and in at least some implementations, the computing platform may utilize one or more data analytics operations that serve to analyze the software application to determine the set of possible code paths. As one possibility, such a data analytics operation may be embodied in the form of a code coverage analytic tool that is configured to determine possible code paths. For instance, in an example, in order to determine possible code paths, a code coverage analytic tool may receive code of a software application and translate the code into a sequence of statements, conditional statements (e.g., "IF" statements), and loops. The code coverage analytic tool may also identify what is the condition(s) that gets to a given point of the code. In practice, a code coverage analytic tool may analyze code and mark statements of the code that are hit as the code coverage analytic tool goes through the analysis of the code. Further, the code coverage analytic tool may determine how many statements have been marked (e.g., hit), in order to determine an amount of coverage being provided by the code coverage analytic tool.

As another possibility, such a data analytics operation may be embodied in the form of a data science model that is applied to code associated with the software application in order to determine possible code paths. For instance, in an example, the data science model may include one or more machine learning models to output predicted possible code paths for the software application. Further, computing platform 106 may be configured to identify the set of possible code paths based on the predicted possible code paths for the software application.

In other implementations, computing platform 106 may receive data identifying the possible code paths and determine the set of possible code paths based on the received data. For instance, a developer may manually determine the possible code paths via code inspection and data regarding the manually determined possible code paths may thereafter be provided to computing platform 106. Computing platform 106 may determine the set of possible code paths in other manners as well.

As an illustrative example of determining a set of possible code paths encoded within a software application associated with check processing, continuing the example discussed above of the software application that has three available code paths, computing platform 106 may determine that (i) the first available code path encoded within the software application is for checks having a number of digits in the checking account number greater than 10 and a check amount greater than or equal to 100, (ii) the second available code path encoded within the software application is for checks having a number of digits in the checking account number greater than 10 a check amount less than 100, and (iii) the third available code path encoded within the software application is for checks having number of digits in the checking account number less than or equal to 10.

Further, at block 304, computing platform 106 determines, based on the determined set of possible code paths and a set of electronic check records for individual checks, a subset of electronic check records from the set of electronic check records to be used for testing the software application, wherein each of the electronic check records in the subset corresponds to a respective one of the possible code paths. As discussed above with respect to FIG. 2, computing platform 106 may receive real-world check data. This real-world check data may comprise the set of electronic check records for individual checks. After receiving the set of electronic check records for individual checks and determining the set of possible code paths encoded within a software application associated with check processing, computing platform 106 may use the determined set of possible code paths and received set of electronic check records for individual checks to determine the subset of electronic check records. Computing platform 106 may determine the subset of electronic check records based on the determined set of possible code paths and a set of electronic check records for individual checks in various ways. In general, determining the subset of electronic check records involves reducing the set of electronic check records for individual checks such that the reduced set of electronic check records includes, for each possible code path, at least one electronic check record that corresponds to the possible code path. In this manner, the subset of electronic check records (i.e., the reduced set)

can ensure test coverage for each possible code path of the software application to be tested.

In order to identify checks to cover all possible code paths (and thus provide full test coverage for the software application), computing platform 106 may analyze the electronic check records to determine the code paths that would be used to process the checks. In some examples, computing platform 106 may (i) determine a predefined set of variables that impact code paths to be utilized during processing of checks using the software application and (ii) derive values from the check records for the predefined set of variables that impact code paths to be utilized during processing of checks using the software application. In turn, the subset of electronic check records may be determined based on the possible code paths and the values that are derived from the check records.

Computing platform 106 may determine the predefined set of variables that impact code paths to be utilized during processing of checks using the software application in any suitable manner, and in at least some implementations, the computing platform may utilize one or more data analytics operations that serve to analyze the software application to determine the predefined set of variables that impact code paths to be utilized during processing of checks using the software application. As one possibility, such a data analytics operation may be embodied in the form of a code coverage analytic tool that is configured to determine the predefined set of variables that impact code paths to be utilized during processing of checks using the software application.

As another possibility, such a data analytics operation may be embodied in the form of a data science model that is applied to code associated with the software application in order to determine the predefined set of variables that impact code paths to be utilized during processing of checks using the software application. For instance, in an example, the data science model may include one or more machine learning models to output predicted variables that impact code paths to be utilized during processing of checks using the software application. Further, computing platform 106 may be configured to identify the predefined set of variables that impact code paths to be utilized during processing of checks using the software application based on the predicted variables.

In other implementations, computing platform 106 may receive data identifying the predefined set of variables that impact code paths to be utilized during processing of checks using the software application and determine the predefined set of variables based on the received data. For instance, a developer may manually determine the predefined set of variables via code inspection and data regarding the manually determined predefined set of variables may thereafter be provided to computing platform 106. Computing platform 106 may determine the predefined set of variables in other manners as well.

In practice, the predefined set of variables may depend on the specific software application to be tested. As an illustrative example, continuing the example discussed above of the software application that has three available code paths, the predefined set of variables that impact code paths to be utilized during processing of checks using the software application includes the two variables of (i) the number of digits in the checking account number and (ii) the amount of the check.

Further, computing platform 106 may derive values from the check records for the predefined set of variables that impact code paths to be utilized during processing of checks using the software application in any suitable manner. In an example, computing platform 106 may analyze each check record to determine a respective set of determined values for the predefined set of variables that impact code paths to be utilized during processing of checks using the software application. Based on the respective set of determined values, computing platform 106 may determine the possible code path that would be used to process that check record.

For instance, continuing the illustrative example above of the software application that has three available code paths, computing platform 106 may, for each respective check record, determine (i) a value for the number of digits in the checking account number and (ii) a value for the amount of the check. In turn, for each respective check record and based on the determined values for the respective check record, computing platform 106 may determine, whether the number of digits in the checking account number is greater than 10 and whether the check amount is greater than or equal to 100. Based on those determinations, computing platform 106 may then determine which possible code path of the three possible code paths would be used to process the respective check record.

After deriving the values and determining which code paths are used to process the checks, computing platform 106 may use the derived values for the check records and/or the determinations of which code paths are used to process the checks to ensure that that the reduced set of electronic check records includes, for each possible code path, at least one check that corresponds to the possible code path. For instance, continuing the illustrative example above of the software application that has three available code paths, computing platform 106 may use the derived values for the check records and/or the determinations of which code paths are used to process the checks to ensure that that the reduced set of electronic check records includes at least one check that corresponds to the first code path, at least one check that corresponds to the second code path, and at least one code path that corresponds to the third code path.

In some implementations, computing platform 106 determining a subset of electronic check records from the set of electronic check records to be used for testing the software application involves computing platform 106 minimizing a number of electronic check records included in the subset such that the subset of electronic check records comprises a single electronic check record for each possible code path in the set of possible code paths.

Computing platform 106 may minimize the number of electronic check records included in the subset in various ways. In an example, in order to minimize the number of electronic check records, computing platform 106 may iterate through the check records in order to identify checks for all of the possible code paths. A flow diagram of an example process 310 that may be carried out by computing platform 106 for iterating through the electronic check records in the set of electronic check records for individual checks and thereby minimizing the number of electronic check records in the subset is described with respect to FIG. 3B. For purposes of illustration only, example process 310 is described as being carried out by computing platform 106 of FIG. 1, but it should be understood that example process 310 may be carried out by computing platforms that take other forms as well. Further, it should be understood that, in practice, the functions described with reference to FIG. 3B may be encoded in the form of program instructions that are executable by one or more processors of computing platform 106. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

Figure 3B:
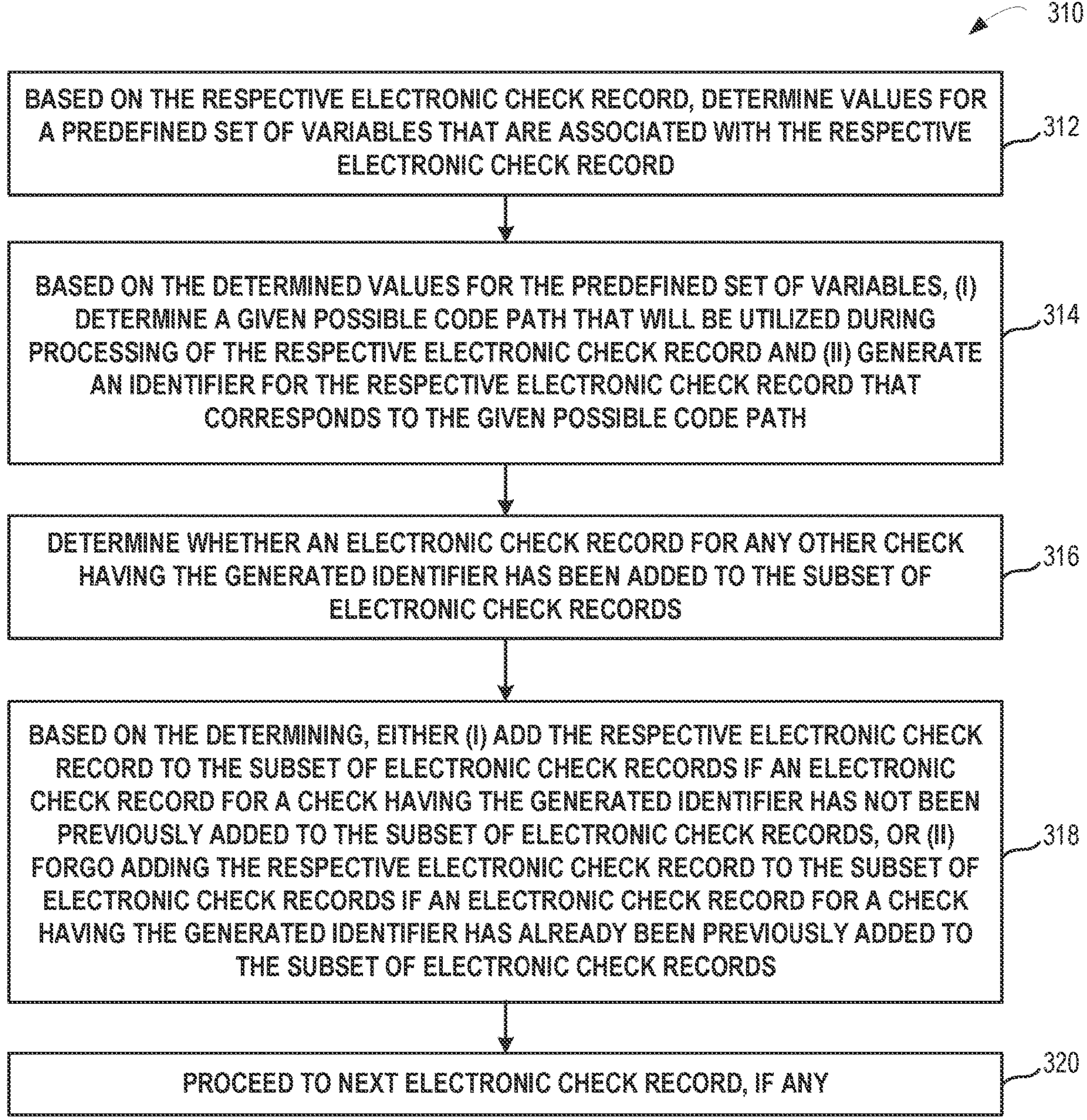
FIG. 3B depicts a flow diagram of an example process for iterating through electronic check records in a set of electronic check records for individual checks and thereby minimizing a number of electronic check records included in the subset, according to aspects of the disclosed technology.

As shown in FIG. 3B, process 310 may begin at block 312 with computing platform 106 determining, based on a respective electronic check record, values for the predefined set of variables that are associated with the respective electronic check record. As described above, computing platform 106 may analyze the electronic check record to determine a respective set of determined values for the predefined set of variables that impact code paths to be utilized during processing of checks using the software application.

At block 314, computing platform 106 may, based on the determined values for the predefined set of variables, (i) determine a given possible code path that will be utilized during processing of the respective electronic check record and (ii) generate an identifier for the respective electronic check record that corresponds to the given possible code path. As described above, the determined values for the predefined set of variables for the respective electronic check record may dictate the one code path that will be utilized during processing of the respective electronic check record. Further, in general, the identifier for the respective electronic check record that corresponds to the given possible code path may be any suitable identifier that is indicative of the one code path would be utilized to process the check. For instance, the identifier may be any suitable numeric identifier or alphanumeric identifier, among other possibilities.

As an illustrative example, continuing the example discussed above of the software application that has three available code paths, computing platform 106 may generate the identifier for the respective electronic check record by (i) assigning the respective check record a first identifier (e.g., 1) if the determined given possible code path that will be utilized during processing of the respective electronic check record is the first code path (i.e., if the number of digits in the checking account number is greater than 10 and the check amount is greater than or equal to 100), (ii) assigning the respective check record a second identifier (e.g., 2) if the determined given possible code path that will be utilized during processing of the respective electronic check record is the second code path (i.e., if the number of digits in the checking account number is greater than 10 and the check amount is less than 100), or (iii) assigning the respective check record a third identifier (e.g., 3) if the determined given possible code path that will be utilized during processing of the respective electronic check record is the third code path (i.e., if the number of digits in the checking account number is less than or equal to 10, perform a third action).

At block 316, computing platform 106 may determine whether an electronic check record for any other check having the generated identifier has been added to the subset of electronic check records. In an example, computing platform 106 may compare the generated identifier for the respective check against a list of generated identifiers for previously-processed checks. For instance, in a scenario where the generated identifier for a given electronic check record is the third identifier (e.g., 3), computing platform 106 may compare that third identifier to a list a generated identifiers to determine whether the third identifier is already included in the list.

At block 318, computing platform 106 may then, based on the determining, either (i) add the respective electronic check record to the subset of electronic check records if an electronic check record for a check having the generated identifier has not been previously added to the subset of electronic check records, or (ii) forgo adding the respective electronic check record to the subset of electronic check records if an electronic check record for a check having the generated identifier has already been previously added to the subset of electronic check records.

At block 320, computing platform 106 may then proceed to the next electronic check record (if any electronic check records remain to be analyzed) and may thereafter conduct process 310 with respect to the next electronic check record. By iterating through checks in this manner, electronic check records are only added to the subset of electronic check records if they implicate a new code path within the software application, and the subset will thus include only a single electronic check record for each possible code path in the set of possible code paths. For instance, continuing the example discussed above of the software application that has three available code paths, the minimized subset would include an electronic check record having the first identifier, an electronic check record having the second identifier, and an electronic check record having the third identifier.

In some examples, computing platform 106 may iterate through every electronic check record in the set of electronic check records until each electronic check record has been analyzed. In other examples, computing platform 106 may iterate through the electronic check records in the set of electronic check records until the computing platform 106 identifies electronic check records for all of the possible code paths. Other examples are possible as well.

As mentioned above, the identifier for the respective electronic check record that corresponds to the given possible code path may be any suitable identifier that is indicative of the one code path would be utilized to process the check. In some examples, the generated identifier may comprise a string of data that includes a respective indicator (e.g., a numeric indicator, and alphanumeric indicator, etc.) for each of the predefined set of variables. In other words, computing platform 106 may encode indicators for the determined values for the given set of variables into the identifier for the respective electronic check record. As an illustrative example of an identifier that includes such a string of data related to the predefined set of variables, computing platform 106 may determine that an example software application for processing electronic records contained within an X9.37 data file is associated with a predefined set of variables that includes a first variable, a second variable, one or more third variables, a fourth variable, and one or more fifth variables. More particularly, in this illustrative example, the first variable may be the check type name, the second variable may be the number of parts in the On Us field, the one or more third variables may be the length of each part of the On Us field, the fourth variable may be the length of the auxiliary On Us field, and the one or more fifth variables may be each type of error detected in the electronic check records (if any). Regarding the one or more fifth variables, the example software application is configured to analyze electronic check records for a plurality of predefined errors.

For any respective electronic check record, the values for these variables for the respective electronic check record may dictate the given possible code path that will be utilized during processing of the respective electronic check record. Further, the identifier may be a string that includes data for each of the first through fifth variables. For instance, in order to generate the identifier for the respective electronic check record that corresponds to the given possible code path, computing platform 106 may form a string by (i) adding the check type name to the string, (ii) adding the number of parts in the On Us field to the string, (iii) adding the length of each part of the On Us field to the string. (iv) adding the length of the auxiliary On Us field to the string, and (v) adding each type of error detected in the check to the string. After these are added to the string, the string may serve as the identifier for the respective electronic check record that corresponds to the given possible code path. In this illustrative example, during iterating through the checks, computing platform 106 may determine whether an electronic check record for any other check having the same string has been added to the subset of electronic check records by comparing the string for the respective check against a list of generated strings for previously-processed checks. In other words, the identifier which is returned by this code may be used to determine if two checks are identical from a test code perspective (i.e., correspond to the same possible code path), which is used to determine which checks can be not added to the subset.

Figure 4A:
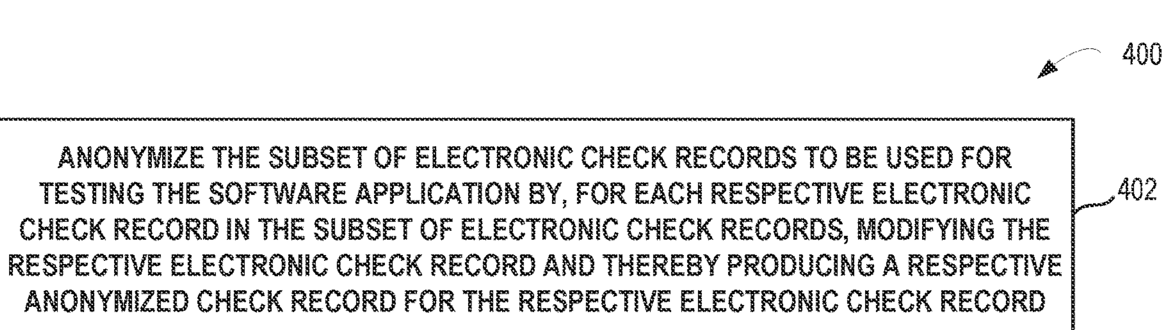
FIG. 4A depicts a flow diagram of an example process for anonymizing real-world check data, according to aspects of the disclosed technology.

After computing platform 106 has determined the subset of electronic check records from the set of electronic check records to be used for testing the software application, computing platform 106 may then anonymize the subset of electronic check records to be used for testing the software application. Computing platform 106 may anonymize the subset of electronic check records to be used for testing the software application in various ways. Turning to FIG. 4A, a flow diagram of an example process 400 that may be carried out by computing platform 106 in order to anonymize real-world check data is depicted. For purposes of illustration only, example process 400 is described as being carried out by computing platform 106 of FIG. 1, but it should be understood that example process 400 may be carried out by computing platforms that take other forms as well. Further, it should be understood that, in practice, the functions described with reference to FIG. 4A may be encoded in the form of program instructions that are executable by one or more processors of computing platform 106. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 4A, the example process 400 may involve at block 402 computing platform 106 anonymizing the subset of electronic check records to be used for testing the software application by, for each respective electronic check record in the subset of electronic check records, modifying the respective electronic check record and thereby producing a respective anonymized check record for the respective electronic check record. In general, modifying the respective electronic check record may involve modifying the respective electronic check record to remove any sensitive data from the electronic check record thereby producing the respective anonymized check record.

As mentioned above, various sensitive data is possible including, for instance, name information, address information, and/or account-number information, among other possibilities. Further, in general, sensitive data may be removed in any suitable way. In this regard, removing sensitive data may take various forms including, for instance, deleting the sensitive data from the electronic check record, altering the sensitive data within the electronic check record such that it is no longer sensitive, or a combination thereof. In practice, the manner in which the sensitive data is removed may depend on various factors, such as the type of data to be anonymized and/or whether the software application for which the anonymized subset of electronic check records is being generated utilizes the data. For instance, in some examples, different software applications may require different data to process electronics check records, and how at least some sensitive data is removed may vary for the different software applications. As one example, a first software application may require an image to process electronic check records (in which case the image data may be altered), whereas a second software application may not require an image to process electronic check records (in which case the image data may be deleted). As another example, a first software application may process electronic check records having different sets of payors (e.g., business v. individual) differently (in which case payor information may be altered rather than deleted), whereas a second software application may process electronic check records having different sets of payors (e.g., business v. individual) the same (in which case payor information may be deleted). Other examples are possible as well.

Within examples, sensitive data may be associated with one or more various parts of the check record records (e.g., different data fields of the electronic check record), and modifying the electronic check record may involve modifying each part of the check record that is known to contain sensitive information. Further, the parts of the electronic check record containing sensitive data may depend on the check-processing format utilized by the software application. In an example, the parts of the check record known to contain sensitive information may be image data, name data, and account number data, among other possibilities. Computing platform 106 modifying the respective electronic check record may involve (i) anonymizing image data of the respective electronic check record, (ii) anonymizing a name associated with a name data field of the respective electronic check record, and (iii) anonymizing an account number associated with an account number data field of the respective electronic check record. Examples of modifying these parts of the electronic check record are discussed in greater detail below.

Turning first to anonymizing image data, in general, anonymizing image data of the respective electronic check record may involve removing and/or altering the image data of the respective electronic check record. As indicated above, whether to remove or alter the image may depend on the particular software application to be tested. For instance, in a scenario where the software application does not process the images, the image data may be deleted. On the other hand, in a scenario where the software application does process the images, computing platform 106 may generate anonymized image data for the electronic check record. Computing platform 106 may generate anonymized image data in various ways. In an example of an X9.37 formatted file, the X9.37 standard specifies that the image data be in Tagged Image File Format (TIFF) 6.0 format. In order to generate anonymized image data for the electronic check record, computing platform 106 may use an image template with the location of the various check fields defined to render a complete image. There are two images to render—namely, the front and the back of the check. Once a TIFF image has been generated, the TIFF image may be base64 encoded to generate image data for the image, and the image data may be saved to the check.imageViewData[n].imageData field of the X9.37 file, where n=0 for the front image and n=1 for the back image. Further, if other fields under check.imageViewData[n] are needed for testing, those other fields may be appropriately with test values (e.g., generic values). Anonymized image data may be generated in other ways as well.

Turning next to anonymizing a name associated with a name data field of the respective electronic check record, in general, anonymizing a name associated with a name data field of the respective electronic check record may involve removing or altering a name associated with a name data field of the respective electronic check record. For instance, in a scenario where the software application does not utilize a name in the name data field, computing platform 106 may simply delete the name from the name data field of the respective electronic check record. On the other hand, in a scenario where the software application does utilize a name in the name data field, computing platform 106 may alter the name in the name data field by producing an anonymized version of the name, such as by changing the name to a generic name (e.g., "John Smith"). In practice, an electronic check record may include a plurality of data fields that include name information. For instance, in an example of an X9.37 formatted file, a payee name field may be found in the addendum A section, and a user field may be found in the addendum A and C sections. Each of these data fields may be anonymized. Other examples are possible as well.

Turning next to anonymizing an account number associated with an account number data field of the respective electronic check record, in general, anonymizing an account number associated with an account number data field of the respective electronic check record may involve removing or altering an account number associated with an account number data field of the respective electronic check record. For instance, in a scenario where the software application does not utilize an account number in the account number data field, computing platform 106 may simply delete the account number from the account number data field of the respective electronic check record. On the other hand, in a scenario where the software application does utilize an account number in the account number data field, computing platform 106 may alter the account number in the account number data field by producing an anonymized version of the account number.

In practice, the length of a checking account number and/or the values of the checking account number may affect the possible code path to be utilized by the software application for processing the electronic check records. In this regard, some account numbers may be well-known public data, some account numbers may contain a well-known, public prefix but have a remainder of the account number that is private, and some account numbers may be completely private. Further, for some example software applications, some account numbers (e.g., public account numbers) and/or portions of some account numbers (e.g., public prefixes of private account numbers) may need to be maintained, as specific processing may be used for these accounts (and changing the account number or portion of the account number may bypass the code paths used to process the checks associated with those account numbers). Therefore, in some examples, anonymization of the account number may involve altering any private portion of the account number and maintaining the public portion of the account number.

Computing platform 106 may anonymize the private portion of the account number and maintain the public portion of the account number in various ways. For instance, in an example, computing platform 106 may determine which portion of the number should be anonymized and then anonymize that portion by replacing each of the numbers with some designated placeholder number such as a zero. In an example of an X9.37 formatted file, the account number may be found on the "On Us" field of an electronic representation of a check record within an X9.37 formatted file. Further, computing platform 106 may assign each check an account-number-anonymization factor. The account-number-anonymization factor may be the number of digits of the account number that should not be anonymized. In an example, the account-number-anonymization factor may be based on the type of check. Based on the account-number-anonymization factor, computing platform 106 may maintain the first portion of the checking account number in accordance with the account-number-anonymization factor, and then alter the remaining portion of the checking account number (e.g., by replacing each of the numbers with some designated placeholder number such as a zero). In some examples, this modified version may serve as the anonymized account number in which the sensitive data associated with the account number has been removed. However, in other examples, the software application being tested may include a check digit validation function, which may involve performing one or more validations based on the number of digits in the checking account number. In a scenario where the software application would perform check-digit validation on the electronic check record to be anonymized, the anonymized account number should pass or fail check digit validation just as the non-anonymized account number. In order to ensure consistent check digit validation, computing platform 106 may be configured to recompute a check digit validation number for the anonymized account number. Therefore, in such an example, computing platform 106 may further modify the account number such that (i) the further modified version would pass validation if the non-anonymized account number would pass check-digit validation or (ii) the further modified version would fail validation if the non-anonymized account number would fail check-digit validation.

As an illustrative example, is some scenarios, the last digit of an account number may depend on the preceding digits of the account number and, in such a scenario, computing platform 106 may further modify the modified version to include a last digit that take into account the check validation function. For instance, in an example where the non-anonymized account number passed validation, computing platform 106 may make the check validation pass for the anonymized account by replacing the last number with the correct digit. On the other hand, in an example where the non-anonymized account failed check digit validation, computing platform 106 may make check digit validation fail by replacing the last character with an incorrect digit. The modified version of the account number with the replaced last digit may then serve as the anonymized account number.

Other examples for anonymizing an account number are possible as well.

In an example, in order to anonymize the electronic check records in the subset of electronic check records, computing platform 106 may iterate through the electronic check records in the subset of electronic check records. A flow diagram of an example process 410 that may be carried out by computing platform 106 for iterating through the electronic check records in the subset of electronic check records and thereby anonymizing the electronic check records in the subset is described with respect to FIG. 4B. For purposes of illustration only, example process 410 is described as being carried out by computing platform 106 of FIG. 1, but it should be understood that example process 310 may be carried out by computing platforms that take other forms as well. Further, it should be understood that, in practice, the functions described with reference to FIG. 4B may be encoded in the form of program instructions that are executable by one or more processors of computing platform 106. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As an initial matter, in the example process 410, the subset of electronic check records to be used for testing the software application may be stored in a data file that is formatted in a check-processing format utilized by the software application, and the data file may include one or more fields that are known to contain sensitive information. Process 410 may begin at block 412, where computing platform 106 may anonymize the data of each data field within the electronic check record for the respective check that is known to contain sensitive information and thereby produce an anonymized data record for the respective check. In practice, computing platform 106 could sequentially iterate through the electronic check record field-by-field to perform this anonymization or could process all of the data fields in parallel, among other possibilities. Further, at block 414, after anonymizing the electronic check record, computing platform 106 may replace the respective check's electronic data record within the test check data file with the anonymized data record that has been produced for the respective check. Still further, at block 416, computing platform 106 may proceed to the next electronic check record (if any electronic check records remain to be anonymized) and may thereafter conduct process 410 with respect to the next electronic check record.

Figure 4B:
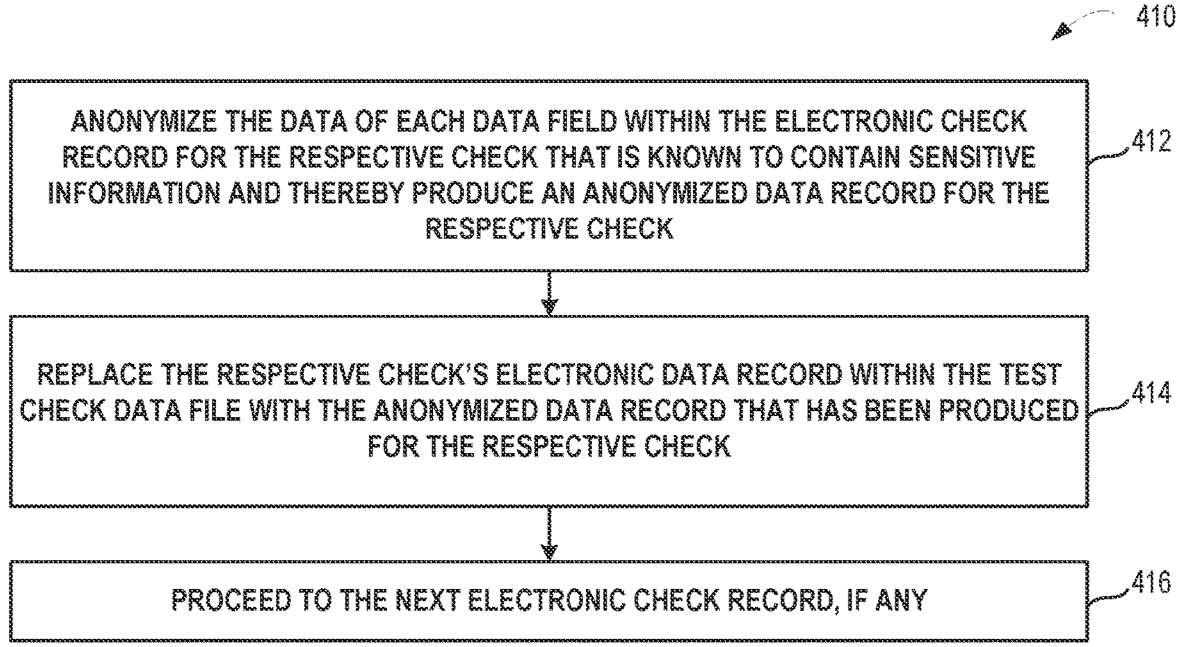
FIG. 4B depicts a flow diagram of an example process for iterating through electronic check records in subset of electronic check records and thereby anonymizing the electronic check records in the subset, according to aspects of the disclosed technology.

Although in this example of FIG. 4B the electronic check records are anonymized after the set of electronic check records is reduced or minimized, in other examples the set of electronic check records could be anonymized prior to reducing or minimizing the set of electronic check records.

After anonymizing the subset of electronic check records to be used for testing the software application, the anonymized subset of check records may be stored such that the anonymized subset of check records is accessible for testing the software application. In an example, computing platform 106 is configured to store the anonymized subset electronic check records in a source control system. In this regard, computing platform 106 may include a source control system 116, and computing platform 106 may store the anonymized subset electronic check records in the source control system 116 such that anonymized subset electronic check records may then be accessed for testing the software application (e.g., prior to deploying the software application and/or after deploying the software application). Further, the anonymized subset of check records may be stored in a data file that is formatted in a check-processing format utilized by the software application (e.g., an X9.37 file).

Computing platform 106 may also be configured to test the software application using the anonymized subset of electronic check records. As mentioned above, the anonymized subset of electronic check records may be used to test a software application prior to deploying the software application and/or after deploying the software application. By testing the software application using the anonymized subset of electronic check records, computing platform 106 may test each code path using test check data that is based on real-world check data, and this testing may help to identify any processing errors or issues associated with the software application.

As mentioned above, the software technology disclosed herein is primarily described with reference to a software subsystem that is hosted by a computing platform operated by a payor bank. However, the disclosed software technology could be described with reference to software subsystems that are operable at different stages of the check processing flow, such as with reference to software subsystems operated by a payee bank or a third-party intermediary. Further, disclosed software technology could be described with reference to software subsystems implemented outside of the check processing flow, such as a software subsystem that conducts an after-the-fact analysis on checks that were previously processed. Other examples are possible as well.

Figure 5:
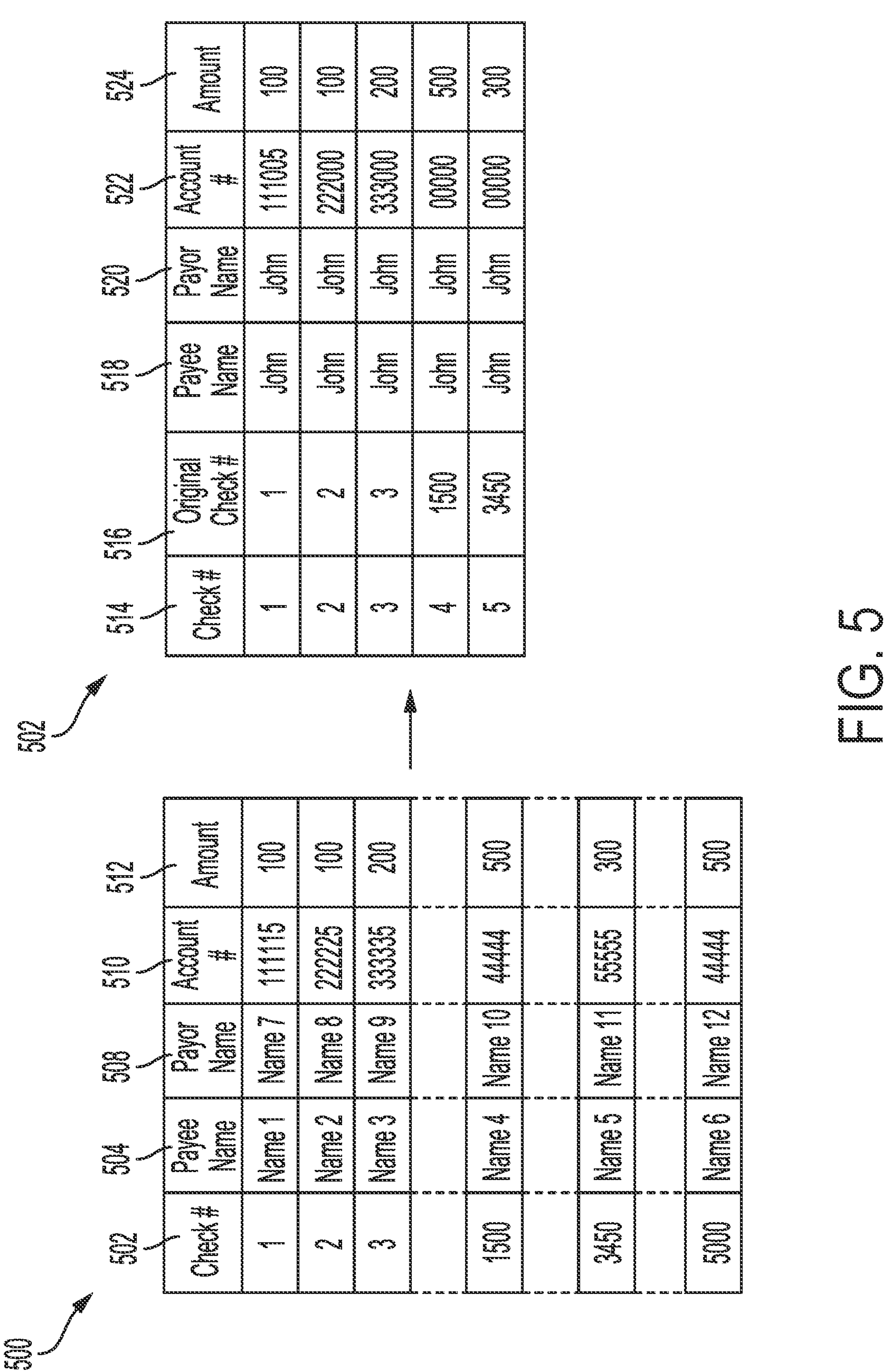
FIG. 5 is a simplified illustration of transformation of a data file for real-world check data to a test data file in accordance with the present disclosure.

As discussed above, the number of electronic check records in the anonymized subset of check records may be significantly reduced compared to the number of electronic check records in the set of electronic check records, which may help to reduce computing resources for testing software applications for processing checks. As an illustrative example of a significantly reduced number of electronic check records in the anonymized subset of check records, FIG. 5 depicts transformation of an example data file for real-world check data to an example test data file. In particular, FIG. 5 illustrates an X9.37 data file 500 that is transformed to an X9.37 test data file 502. The X9.37 data file 500 includes real-world check data for a plurality of electronic check records. In this example, the file includes a check-number column 504, a payee-name column 506, a payor-name column 508, and account-number column 510, and a check-amount column 512. Data for each of the 5,000 checks is populated into the XC9.37 data file 500. In this example. X9.37 file includes data for 5,000 electronic check records; however, fewer or more electronic check records are possible.

Turning now to X9.37 test data file 502, the X9.37 test data file includes anonymized data for a substantially reduced number of electronic check records. In this example, X9.37 test data file 502 includes data for 5 electronic check records; however, fewer or more electronic check records are possible and may depend on the possible code paths of the software application to be tested using X9.37 test data file 502. Test data file 502 includes a check-number column 514, an original-check-number column 516, a payee-name column 518, a payor-name column 520, an account-number column 522, and a check-amount column 524. As is evident from the data included on original-check-number column 516, test data file 502 includes five electronic check records that correspond to the electronic check records in X9.37 data file 500 for checks 1, 2, 3, 1000, and 3450. Further, data in payee-name column 518, payor-name column 520, and account-number column 522 has been anonymized for each of the electronic check records in the test data file. On the other hand, the data in check-amount column 524 remains the same as the data that was included in check-amount column 512 for X9.37 data file 500. Test data file 502 may be used to test the software application and, in particular, to test each of the five possible code paths of the software application.

It should be understood that is a simplified graphical representation of an X9.37 file, and in practice an X9.37 file may contain additional and/or alternative information for the electronic check records. Further, test data file 502 includes original-check-number column 516. This original-check-number column 516 is included for purposes of illustration, in order to clearly illustrate which electronic check records from the X9.37 data file 500 are included in the subset of electronic check records for test data file 502, but in practice the indication of original check number need not be included in the test data file.

Figure 6:
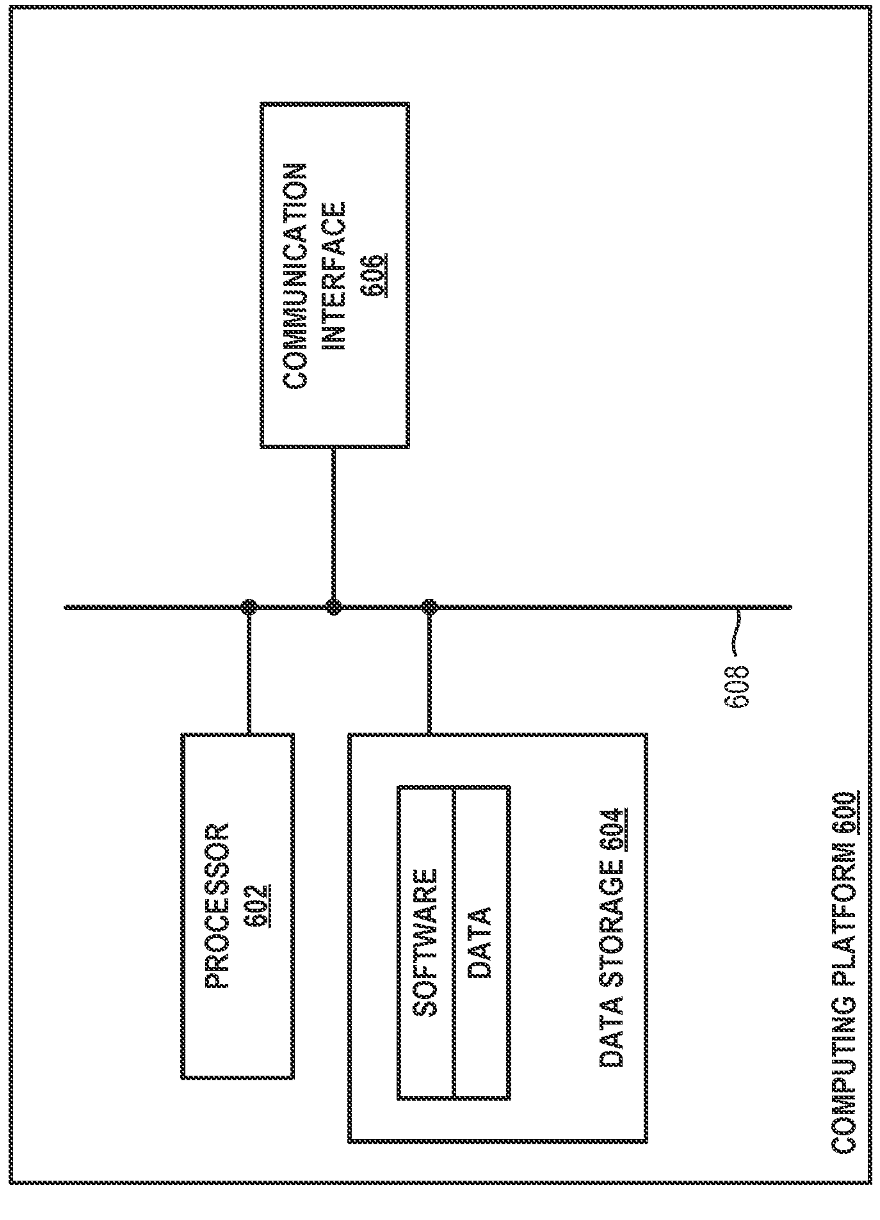
FIG. 6 is a simplified block diagram that illustrates some structural components of an example computing platform.

Turning now to FIG. 6, a simplified block diagram is provided to illustrate some structural components that may be included in an example computing platform 600, which may be configured to host and execute the new software technology disclosed herein, such as the software subsystem of computing platform 106. At a high level, the computing platform 600 may generally comprise any one or more computing systems that collectively include at least a processor 602, data storage 604, and a communication interface 606, all of which may be communicatively linked by a communication link 608 that may take the form of a system bus, a communication network such as a public, private, or hybrid cloud, or some other connection mechanism. Each of these components may take various forms.

Processor 602 may comprise one or more processing components, such as general-purpose processors (e.g., a single- or multi-core a central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. In line with the discussion above, it should also be understood that processor 602 could comprise processing components that are distributed across a plurality of physical computing devices connected via a network, such as a computing cluster of a public, private, or hybrid cloud.

In turn, data storage 604 may comprise one or more non-transitory computer-readable storage mediums that are collectively configured to store (i) program instructions that are executable by processor 602 such that computing platform 600 is configured to perform some or all of the disclosed functions, and (ii) data that may be received, derived, or otherwise stored by computing platform 600 in connection with the disclosed functions. In this respect, the one or more non-transitory computer-readable storage mediums of data storage 604 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 604 may comprise computer-readable storage mediums that are distributed across a plurality of physical computing devices connected via a network, such as a storage cluster of a public, private, or hybrid cloud. Data storage 604 may take other forms and/or store data in other manners as well.

Communication interface 606 may be configured to facilitate wireless and/or wired communication with client stations (e.g., one or more client stations 112 of FIG. 1) and/or third-party computing platforms. Additionally, in an implementation where the computing platform 600 comprises a plurality of physical computing devices connected via a network, communication interface 606 may be configured to facilitate wireless and/or wired communication between these physical computing devices (e.g., between computing and storage clusters in a cloud network). As such, communication interface 606 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Communication interface 606 may also include multiple communication interfaces of different types. Other configurations are possible as well.

Although not shown, computing platform 600 may additionally include or have an interface for connecting to one or more user-interface components that facilitate user interaction with computing platform 600, such as a keyboard, a mouse, a trackpad, a display screen, a touch-sensitive interface, a stylus, a virtual-reality headset, and/or one or more speaker components, among other possibilities.

It should be understood that the computing platform 600 is one example of a computing platform that may be used with the embodiments described herein. Numerous other arrangements are possible and contemplated herein. For instance, in other embodiments, computing platform 600 may include additional components not pictured and/or more or fewer of the pictured components.

Example embodiments of the disclosed innovations have been described above. Those skilled in the art will understand, however, that changes and modifications may be made to the embodiments described without departing from the true scope and spirit of the present invention, which will be defined by the claims. For instance, those in the art will understand that the disclosed technology for generating test check data that can be used for purposes of testing a software application that processes electronic representations of checks may be implemented in areas other than for purposes of testing a software application that processes electronic representations of checks.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing platform comprising:

a communication interface;

at least one processor;

at least one non-transitory computer-readable medium; and program instructions stored on the at least one non-transitory computer-readable medium that are executable by the at least one processor to cause the computing platform to:

determine a set of possible code paths encoded within a software application associated with processing electronic check records, wherein the set of possible code paths is determined by a computer-implemented tool that is configured to perform an analysis of code of the software application, and wherein the software application is configured to process check image data in a Tagged Image File Format (TIFF) format;

receive a set of electronic check records for real-world checks that are candidates for use in testing the software application;

reduce the set of electronic check records down to a subset of electronic check records to be used for testing the software application that includes one electronic check record corresponding to each respective possible code path of the set of possible code paths, wherein the subset of electronic check records is determined through an iterative process that iterates through the set of electronic check records and involves, for each respective electronic check record in the set of electronic check records:

(i) determining, for the respective electronic check record, a respective set of values for a given set of variables that are indicative of which possible code path of the software application is to be utilized during processing of the respective electronic check record;

(ii) based on the respective set of values that is determined for the respective electronic check record, identifying a code path from the set of possible code paths that is expected to be utilized during processing of the respective electronic check record;

(iii) determining whether an electronic check record corresponding to the identified code path has already been added to the subset of electronic check records; and (iv) based on the determining, either (a) refraining from adding the respective electronic check record to the subset of electronic check records if an electronic check record corresponding to the identified code path has already been added to the subset of electronic check records or (b) adding the respective electronic check record to the subset of electronic check records if an electronic check record corresponding to the identified code path has not already been added to the subset of electronic check records;

generate a test data file comprising an anonymized version of the subset of electronic check records to be used for testing the software application by, for each respective electronic check record in the subset of electronic check records;

(i) obtaining at least one anonymized TIFF image generated by utilizing a TIFF image template that indicates locations of a plurality of check fields;

(ii) encoding the at least one anonymized TIFF image to generate anonymized image data;

(iii) generating an anonymized version of the respective electronic check record that includes the anonymized image data; and (iv) adding the anonymized version of the respective electronic check record to the test data file; and store the test data file in a source control system, wherein the anonymized version of the subset of electronic check records stored in the source control system is thereafter utilized to test the set of possible code paths of the software application.

2. The computing platform of claim 1, wherein the test data file is formatted in a check-processing format utilized by the software application.

3. The computing platform of claim 1, wherein:

determining whether an electronic check record corresponding to the identified code path has already been added to the subset of electronic check records comprises (i) generating, based on the respective set of values that is determined for the respective electronic check record, an identifier for the respective electronic check record that corresponds to the identified code path and (ii) determining whether an electronic check record for any other check having the generated identifier has been added to the subset of electronic check records;

adding the respective electronic check record to the subset of electronic check records if an electronic check record corresponding to the identified code path has not already been added to the subset of electronic check records comprises adding the respective electronic check record to the subset of electronic check records if an electronic check record for a check having the generated identifier has not been previously added to the subset of electronic check records; and refraining from adding the respective electronic check record to the subset of electronic check records if an electronic check record corresponding to the identified code path has already been added to the subset of electronic check records comprises refraining from adding the respective electronic check record to the subset of electronic check records if an electronic check record for a check having the generated identifier has already been previously added to the subset of electronic check records.

4. The computing platform of claim 1, wherein obtaining the at least one anonymized TIFF image generated by utilizing the TIFF image template that indicates locations of the plurality of check fields comprises generating an anonymized version of a respective image of the respective electronic check record by performing one or more of the following:

anonymizing a name associated with a name data field of the respective image; or anonymizing an account number associated with an account number data field of the respective image.

5. The computing platform of claim 1, wherein the computer-implemented tool comprises a code coverage analytic tool, and wherein the program instructions that are executable by the at least one processor to cause the computing platform to determine the set of possible code paths encoded within the software application associated with processing electronic check records comprise program instructions stored on the at least one non-transitory computer-readable medium that are executable by the at least one processor to cause the computing platform to:

use the code coverage analytic tool to identify the set of possible code paths.

6. The computing platform of claim 1, further comprising program instructions that are executable by the at least one processor to cause the computing platform to:

test the set of possible code paths of the software application using the anonymized subset of electronic check records.

7. The computing platform of claim 1, wherein:

the program instructions that are executable by the at least one processor to cause the computing platform to receive the set of electronic check records for real-world checks that are candidates for use in testing the software application comprise program instructions stored on the at least one non-transitory computer-readable medium that are executable by the at least one processor to cause the computing platform to:

receive a check-record data file comprising the set of electronic check records for real-world checks that are candidates for use in testing the software application, wherein each respective electronic check record in the set of electronic check records comprises a respective set of data values that dictate which possible code path of the software application will be utilized to process the respective electronic check record; and the program instructions that are executable by the at least one processor to cause the computing platform to reduce the set of electronic check records down to the subset of electronic check records to be used for testing the software application that includes one electronic check record corresponding to each respective possible code path of the set of possible code paths comprise program instructions stored on the at least one non-transitory computer-readable medium that are executable by the at least one processor to cause the computing platform to:

reduce the set of electronic check records down to the subset of electronic check records such that the subset of electronic check records includes one electronic check record corresponding to every possible code path of the set of possible code paths and thereby produce a minimized number of electronic check records that provides complete test coverage for the software application while reducing an extent of computing resources involved in testing the software application.

8. The computing platform of claim 1, wherein:

the program instructions that are executable by the at least one processor to cause the computing platform to receive the set of electronic check records for real-world checks that are candidates for use in testing the software application comprise program instructions stored on the at least one non-transitory computer-readable medium that are executable by the at least one processor to cause the computing platform to receive a check-record data file comprising the set of electronic check records for real-world checks that are candidates for use in testing the software application;

the software application is configured to process electronic check records formatted in accordance with an X9.37 standard;

the check-record data file is formatted in accordance with the X9.37 standard; and the test data file is formatted in accordance with the X9.37 standard.

9. The computing platform of claim 1, wherein:

the program instructions that are executable by the at least one processor to cause the computing platform to receive the set of electronic check records for real-world checks that are candidates for use in testing the software application comprise program instructions stored on the at least one non-transitory computer-readable medium that are executable by the at least one processor to cause the computing platform to receive a check-record data file comprising the set of electronic check records for real-world checks that are candidates for use in testing the software application; and the test data file has a byte size that is at least an order of magnitude less than a byte size of the check-record data file.

10. A non-transitory computer-readable medium, wherein the non-transitory computer-readable medium is provisioned with program instructions that, when executed by at least one processor, cause a computing platform to:

determine a set of possible code paths encoded within a software application associated with processing electronic check records, wherein the set of possible code paths is determined by a computer-implemented tool that is configured to perform an analysis of code of the software application, and wherein the software application is configured to process check image data in a Tagged Image File Format (TIFF) format;

receive a set of electronic check records for real-world checks that are candidates for use in testing the software application;

reduce the set of electronic check records down to a subset of electronic check records to be used for testing the software application that includes one electronic check record corresponding to each respective possible code path of the set of possible code paths, wherein the subset of electronic check records is determined through an iterative process that iterates through the set of electronic check records and involves, for each respective electronic check record in the set of electronic check records:

(i) determining, for the respective electronic check record, a respective set of values for a given set of variables that are indicative of which possible code path of the software application is to be utilized during processing of the respective electronic check record;

(ii) based on the respective set of values that is determined for the respective electronic check record, identifying a code path from the set of possible code paths that is expected to be utilized during processing of the respective electronic check record;

(iii) determining whether an electronic check record corresponding to the identified code path has already been added to the subset of electronic check records; and (iv) based on the determining, either (a) refraining from adding the respective electronic check record to the subset of electronic check records if an electronic check record corresponding to the identified code path has already been added to the subset of electronic check records or (b) adding the respective electronic check record to the subset of electronic check records if an electronic check record corresponding to the identified code path has not already been added to the subset of electronic check records;

generate a test data file comprising an anonymized version of the subset of electronic check records to be used for testing the software application by, for each respective electronic check record in the subset of electronic check records;

(i) obtaining at least one anonymized TIFF image generated by utilizing a TIFF image template that indicates locations of a plurality of check fields;

(ii) encoding the at least one anonymized TIFF image to generate anonymized image data;

(iii) generating an anonymized version of the respective electronic check record that includes the anonymized image data; and (iv) adding the anonymized version of the respective electronic check record to the test data file; and store the test data file in a source control system, wherein the anonymized version of the subset of electronic check records stored in the source control system is thereafter utilized to test the set of possible code paths of the software application.

11. The non-transitory computer-readable medium of claim 10, wherein the test data file is formatted in a check-processing format utilized by the software application.

12. The non-transitory computer-readable medium of claim 10, wherein:

determining whether an electronic check record corresponding to the identified code path has already been added to the subset of electronic check records comprises (i) generating, based on the respective set of values that is determined for the respective electronic check record, an identifier for the respective electronic check record that corresponds to the identified code path and (ii) determining whether an electronic check record for any other check having the generated identifier has been added to the subset of electronic check records;

adding the respective electronic check record to the subset of electronic check records if an electronic check record corresponding to the identified code path has not already been added to the subset of electronic check records comprises adding the respective electronic check record to the subset of electronic check records if an electronic check record for a check having the generated identifier has not been previously added to the subset of electronic check records; and refraining from adding the respective electronic check record to the subset of electronic check records if an electronic check record corresponding to the identified code path has already been added to the subset of electronic check records comprises refraining from adding the respective electronic check record to the subset of electronic check records if an electronic check record for a check having the generated identifier has already been previously added to the subset of electronic check records.

13. The non-transitory computer-readable medium of claim 10, wherein obtaining the at least one anonymized TIFF image generated by utilizing the TIFF image template that indicates locations of the plurality of check fields comprises generating an anonymized version of a respective image of the respective electronic check record by performing one or more of the following:

anonymizing a name associated with a name data field of the respective image; or anonymizing an account number associated with an account number data field of the respective image.

14. The non-transitory computer-readable medium of claim 10, wherein the computer-implemented tool comprises a code coverage analytic tool, and wherein the program instructions that, when executed by the at least one processor, cause the computing platform to determine the set of possible code paths encoded within the software application associated with processing electronic check records comprise program instructions that, when executed by the at least one processor, cause the computing platform to:

use the code coverage analytic tool to identify the set of possible code paths.

15. The non-transitory computer-readable medium of claim 10, wherein the non-transitory computer-readable medium is also provisioned with program instructions that, when executed by at least one processor, cause the computing platform to:

test the set of possible code paths of the software application using the anonymized subset of electronic check records.

16. A method carried out by a computing platform, the method comprising:

determining a set of possible code paths encoded within a software application associated with processing electronic check records, wherein the set of possible code paths is determined by a computer-implemented tool that is configured to perform an analysis of code of the software application, and wherein the software application is configured to process check image data in a Tagged Image File Format (TIFF) format;

receiving a set of electronic check records for real-world checks that are candidates for use in testing the software application;

reducing the set of electronic check records down to a subset of electronic check records to be used for testing the software application that includes one electronic check record corresponding to each respective possible code path of the set of possible code paths, wherein the subset of electronic check records is determined through an iterative process that iterates through the set of electronic check records and involves, for each respective electronic check record in the set of electronic check records:

(i) determining, for the respective electronic check record, a respective set of values for a given set of variables that are indicative of which possible code path of the software application is to be utilized during processing of the respective electronic check record;

(ii) based on the respective set of values that is determined for the respective electronic check record, identifying a code path from the set of possible code paths that is expected to be utilized during processing of the respective electronic check record;

(iii) determining whether an electronic check record corresponding to the identified code path has already been added to the subset of electronic check records; and (iv) based on the determining, either (a) refraining from adding the respective electronic check record to the subset of electronic check records if an electronic check record corresponding to the identified code path has already been added to the subset of electronic check records or (b) adding the respective electronic check record to the subset of electronic check records if an electronic check record corresponding to the identified code path has not already been added to the subset of electronic check records;

generate a test data file comprising an anonymized version of the subset of electronic check records to be used for testing the software application by, for each respective electronic check record in the subset of electronic check records;

(i) obtaining at least one anonymized TIFF image generated by utilizing a TIFF image template that indicates locations of a plurality of check fields;

(ii) encoding the at least one anonymized TIFF image to generate anonymized image data;

(iii) generating an anonymized version of the respective electronic check record that includes the anonymized image data; and (iv) adding the anonymized version of the respective electronic check record to the test data file; and storing the test data file in a source control system, wherein the anonymized version of the subset of electronic check records stored in the source control system is thereafter utilized to test the set of possible code paths of the software application.

17. The method of claim 16, wherein the test data file is formatted in a check-processing format utilized by the software application.

18. The method of claim 16, wherein:

determining whether an electronic check record corresponding to the identified code path has already been added to the subset of electronic check records comprises (i) generating, based on the respective set of values that is determined for the respective electronic check record, an identifier for the respective electronic check record that corresponds to the identified code path and (ii) determining whether an electronic check record for any other check having the generated identifier has been added to the subset of electronic check records;

adding the respective electronic check record to the subset of electronic check records if an electronic check record corresponding to the identified code path has not already been added to the subset of electronic check records comprises adding the respective electronic check record to the subset of electronic check records if an electronic check record for a check having the generated identifier has not been previously added to the subset of electronic check records; and refraining from adding the respective electronic check record to the subset of electronic check records if an electronic check record corresponding to the identified code path has already been added to the subset of electronic check records comprises refraining from adding the respective electronic check record to the subset of electronic check records if an electronic check record for a check having the generated identifier has already been previously added to the subset of electronic check records.

* * * * *